United States Patent Office 3,417,137
Patented Dec. 17, 1968

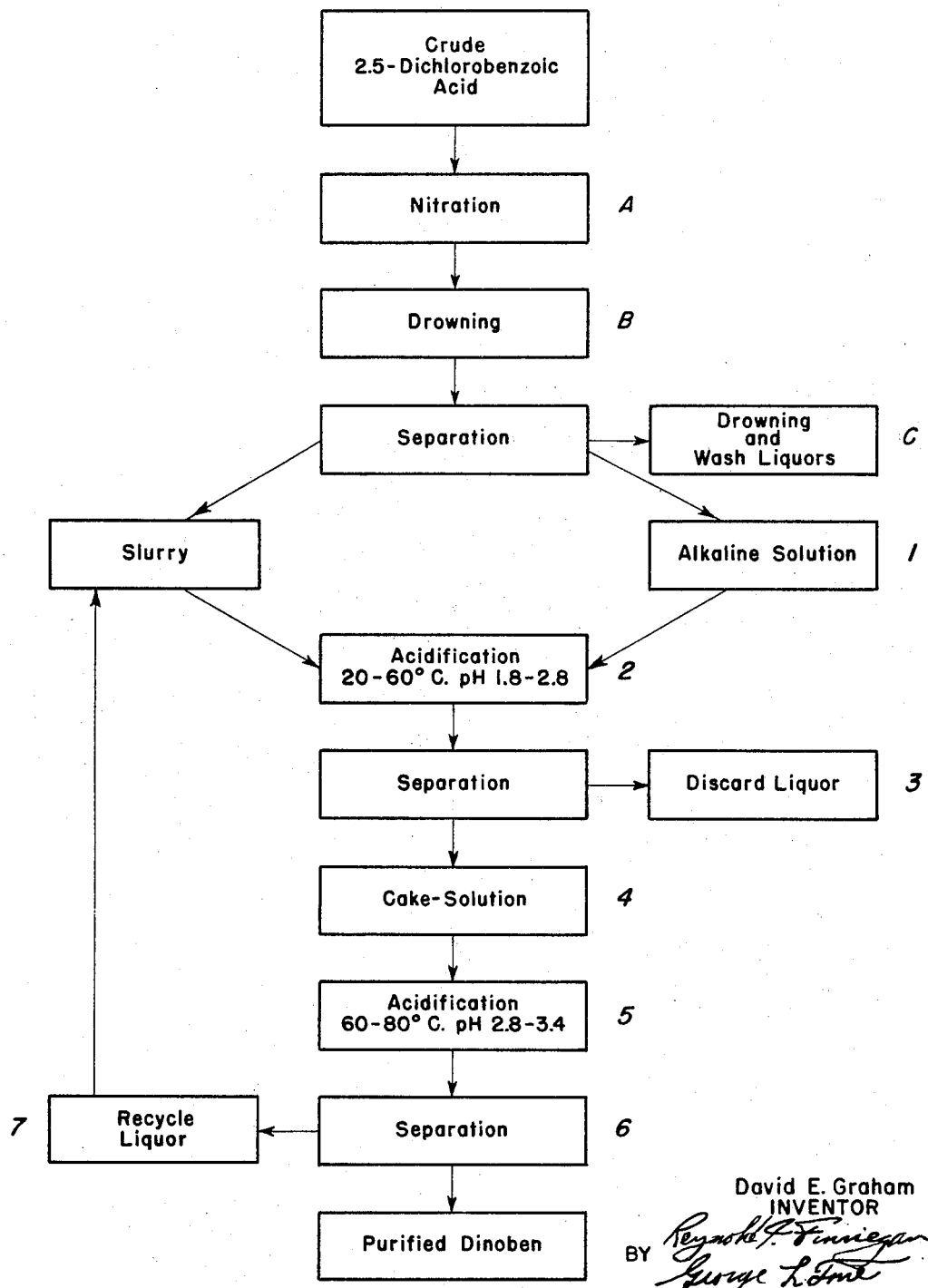

3,417,137
PROCESS FOR THE PURIFICATION OF CRUDE 2,5-DICHLORO-3-NITROBENZOIC ACID (DINOBEN)
David E. Graham, Westfield, N.J., assignor to GAF Corporation, a corporation of Delaware
Filed Mar. 3, 1966, Ser. No. 531,422
4 Claims. (Cl. 260—525)

This present invention relates to a novel improved method for increasing the recovered yield of biologically useable 2,5-dichloro-3-nitrobenzoic acid from its nitrated crude admixture.

This compound possesses outstanding herbicidal selectivity in that it may be employed as taught in U.S. Patent 3,013,873 for the eradication of both narrow and broadleaf weeds from economically desirable crops. Moreover, 2,5-dichloro-3-nitrobenzoic acid (Dinoben) may also be used as an intermediate for the production of 3-amino-2,5-dichlorobenzoic acid, also a herbicide, which is sold as a water soluble salt under the name of Amiben as is disclosed in U.S. Patent 3,014,063. Amiben is widely used especially as a preemergent weed killer in soybeans, snapbeans, tomatoes or squash and the like.

In the manufacture of both of these products it is important to keep the amount of certain highly phytotoxic impurities below definite low levels so that at the required application levels of the herbicides crop damage is avoided. Some of these impurities are always present to greater or lesser extent as a result of one of the known commercial processes for preparing these compounds. As little as 0.09% of the 6-nitro isomer may show definite phytotoxicity. 2,5-dichloro-3-nitrobenzoic acid is made most easily from the corresponding dichlorobenzoic acid, which in turn is made by the chlorination of benzoyl chloride followed by rectification and hydrolysis. The acid chloride can be hydrolyzed by any of the known methods to the acid. After hydrolysis the formed acid can be nitrated by any of the usual conventional methods or by the methods described in U.S. patent application, Ser. No. 328,061, filed Dec. 4, 1963. The product formed by the nitration normally contains other compounds than the 2,5-dichloro-3-nitrobenzoic acid, for example, the 2,5-dichloro-6-nitrobenzoic acid isomer which is highly phytotoxic, 3,4-dichloro-6-nitrobenzoic acid; the nitro compounds derived from impurities, such as 2,3-dichlorobenzoic acid and un-nitrated 2,5-dichlorobenzoic acid in the starting material. Thus, the product is quite crude and the use of technical grade 2,5-dichloro-3-nitrobenzoic acid obtained from a commercial nitration reaction such as hereinabove described, has produced erratic results, at times involving serious crop damage when this technical grade of the herbicide acid was applied to soybeans, squash or snapbeans. Similar erratic results may be obtained when Amiben derived from this technical grade of Dinoben is used.

The use of pure 2,5-dichlorobenzoic acid such as could be obtained by effecting the purification at an early stage of the crude and less expensive 2,5-dichlorobenzoic acid derived from the chlorination of benzoyl chloride is not as economically attractive. In this case, the purification of the corrosive mixture of the chlorinated benzoyl chlorides by fractional distillation is quite difficult, isomeric dichlorobenzoyl chlorides and trichlorinated benzoyl chlorides in particular are difficult to separate because of the closeness of their boiling points. Purification of the corresponding benzoic acids by solvent crystallization, differences in solubility in water at various pH's and other techniques tried, likewise proved quite difficult.

Attempts to separate the undesirable isomers, particularly the 6-nitro compound, from 2,5-dichloro-3-nitrobenzoic acid using standard methods of fractional crystallization and/or solvent extractions have not been feasible on a commercial scale. Excessive costs mitigate against solvent extractions, while fractional crystallization techniques require involved, time-consuming operations. Moreover, although these techniques are relatively successful in ultimately separating the undesirable nitro isomers, they do not remove un-nitrated benzoic acids, so that the latter constituents, even if not detrimental from a herbicidal use viewpoint, constitute essentially inert bulk and are undesirable for this reason.

It has been proposed to purify the crude Dinoben by solution of the crude mixture in water with an alkaline agent such as ammonium hydroxide, potassium hydroxide, or sodium hydroxide and the like, followed by precipitation at a pH of about 3 by the addition of a mineral acid, such as hydrochloric acid, sulfuric acid, or phosphoric acid and the like to isolate the Dinoben compound which is precipitated and can be separated by filtration, centrifuging and the like.

However, in so doing, there is an inevitable yield loss due to the solubility of the desired product under the optimum conditions of the purification process. Pure Dinoben of melting point 221–222° C. and a VPC purity of 99.87 mole percent has a solubility in water at pH 3.0 and 50° C. of 4 grams per liter and at 30° C. of 1.5 grams per liter. In commercial practice, considerable water at pH 3.0 and temperatures of 60–70° are required in the purification step, temperature and pH during the precipitation step are critical to the yield and quality of the product. Cooling down during the filtration and occlusion of impurities in the precipitation step all make the operation a very sensitive one if one is to obtain a biologically satisfactory product.

With the foregoing in mind, the principal object of this invention is to increase the yield (or recovery) of purified 2,5-dichloro-3-nitrobenzoic acid from its crude nitrated admixture by utilizing a batch or continuous process of purification.

Another object of this invention is to provide purified 2,5-dichloro-3-nitrobenzoic acid of such quality that it is biologically useable for weed control without crop damage as Dinoben, without further purification and only if desired need be converted into Amiben before use. Other objects of this invention will become more apparent as the disclosure proceeds.

I have now discovered that the above mentioned difficulties may be overcome and, in fact, a purer product obtained in substantially higher recovered yields.

The process of the instant invention comprises mixing a crude nitration admixture of 2,5-dichloro-3-nitrobenzoic acid with a solution selected from the group consisting of aqueous and aqueous alkaline solutions (i.e., the crude cake is slurried in water or preferably water containing sufficient alkali to partially or wholly dissolve the crude material), and adjusting the conditions of temperature and pH range in a series of slurries and precipitation steps, each succeeding adjustment of at least one of the conditions of temperature and pH being higher than the preceding adjustment, beginning with a temperature in the range of about 20–60° C. and a pH in the range of about 1.8 to 2.8 and ending with a temperature of about at least 50° C. and a pH of about at least 2.4 and separating and recovering purified 2,5-dichloro-3-nitrobenzoic acid from the final step, the liquors of each precipitation step after the initial precipitation step being recycled to slurries of preceding precipitation steps. Thus it is obvious that the filtrate is always advancing toward the cruder cake in a counter-current flow.

The conditions of temperature and pH in the final precipitation step may range from about at least 50° C. up to, below the boiling point of Dinoben solution while the pH may range from about at least 2.4 to about 4, preferred ranges being in the order of about 60–80° C. and a pH of about 2.8 to 3.4. The conditions of temperature and pH in the final precipitation step are largely dependent upon the purity of the acid chloride starting material. For example, when the starting material is relatively pure, lower temperatures and pH may be employed to obtain Dinoben in very good yields without adversely affecting its purity; while when the starting material is relatively crude, higher temperatures and pH may be employed to obtain purified Dinoben without adversely affecting its yield. Adjustment in pH of the various slurries may obviously be carried out by the addition of either acid or base.

More specifically, the instant invention for producing purified 2,5-dichloro-3-nitrobenzoic acid from a crude nitration admixture, thereof, comprises (1) mixing the crude nitration admixture with a solution selected from the group consisting of aqueous and aqueous alkaline solutions; (2) adjusting the solution to a pH of about 1.8 to 2.8 and a temperature of 20–60° C.; (3) separating the precipitated partially purified 2,5-dichloro-3-nitrobenzoic acid; (4) admixing water and alkali hydroxide to the thus recovered 2,5-dichloro-3-nitrobenzoic acid; (5) adjusting at least one of the conditions of temperature and pH of step 4 above that of step 2, the adjustment being about at least 50° C. and about at least a pH of 2.4; (6) separating and recovering precipitated pure 2,5-dichloro-3-nitrobenzoic acid; (7) recycling the liquor recovered from separation step 6 to a point prior to the initial purification step 2, specified above. Normally it is preferred to add sufficient water and alkali hydroxide in step 4 to affect total solution.

A preferred embodiment of the present invention is illustrated in the attached sheet of drawings exemplifying a diagramic flow chart process and may briefly be described as follows:

2,5-dichlorobenzoic acid which may in turn be produced by chlorination of benzoic acid chloride followed by hydrolysis is nitrated with mixed acid (Step A) to produce crude, 2,5-dichloro-3-nitrobenzoic acid (crude Dinoben) which is recovered by drowning (Step B) the nitration mixture in water then separating and washing the solids. The recovered crude Dinoben is separated from the water used for drowning and washing (Step C), then the crude cake is slurried in water or preferably water containing sufficient alkali to partially or wholly dissolve the crude material (Step 1). While it is preferred to dissolve the crude cake with water containing alkali, the process may proceed by merely dissolving the water-soluble impurities of the crude cake so that the step is in effect a leaching operation.

Alkali may be added at this point to affect the desired degree of solution in Step 1. It is obvious that the water and alkali may be added together or separately, if desired. The pH of the solution or slurry is adjusted within the range of 1.8 to 2.8 by addition of acid and the temperature is adjusted to 20 to 60° C. (Step 2). At this pH and temperature essentially all of the Dinoben is precipitated and some of the impurities, while other impurities remain in the liquid so that the liquid is essentially free of the desired Dinoben. The partially purified, precipitated Dinoben is then separated from the acidified liquor by a separation process (Step 3) such as filtration or centrifuging and the separated liquor (filtrate) may be discarded. The partially purified Dinoben is then dissolved in aqueous alkali (Step 4) and the solution then acidified to a pH (Step 5) within the range of 2.8 to 3.4 while maintaining a temperature range of 60 to 80° C. (slightly higher range than in Step 2 above). The conditions of pH and temperature used in this step are those which favor the precipitation of essentially only the desired 2,5-dichloro-3-nitrobenzoic acid (Dinoben), and essentially no precipitation of impurities which were precipitated at the lower temperature and pH range employed in Step 2 occurs, so that essentially pure 2,5-dichlorobenzoic acid is precipitated at this point. However, under those conditions which favor precipitation of pure 2,5-dichloro-3-nitrobenzoic acid some of the 2,5-dichloro-3-nitrobenzoic acid will remain in solution. Accordingly, the precipitated, purified 2,5-dichloro-3-nitrobenzoic acid is recovered from the slurry by suitable separation (Step 6), e.g. filtration or centrifuging, and the liquor recovered in the separation (Step 6) which still contains 2,5-dichloro-3-nitrobenzoic acid is recirculated and recycled (Step 7) in the case of continuous operation to Step 1 above or in the case of batch operation is added to a subsequent batch of Step 1 above. The alkali hydroxides used in the solution steps above may be either sodium hydroxide, potassium hydroxide or ammonium hydroxide and the like, while the acid used in the acidification steps may be a mineral acid such as hydrochloric acid, sulfuric acid or phosphoric acid and the like.

By the practice of this invention the final purified 2,5-dichloro-3-nitrobenzoic acid has been increased to a purity in the range of 88 to 95% pure from the initial precipitated benzoic acid from the drowning and washing which has a purity in the range of 60 to 70% pure.

The process may be run in many variations. For instance, the crude cake can be contacted with the purification liquor in a continuous manner, say by feeding the crude cake countercurrent to the filtrate from a final purification in a horizontal screw conveyor maintaining the desired pH at the cake inlet (which is also the liquor discharge) by the amount of acid present in the crude cake, and by maintaining the temperature at this point by external cooling if necessary. The purification filtrate is preferably added hot. The process can be run continuously in an agitated vessel feeding the final purification filtrate and the crude cake continuously to an agitated vessel maintained at the desired condition, continuously removing a part of the batch and separating the discard liquor and enriched crude cake in a centrifuge, filter or other mechanical device. The number of stages in which this operation is done may also be varied, the filtrate always advancing toward the cruder cake in a countercurrent flow and the later stages preferably being at higher temperatures and/or pH. Batch operation is also readily accomplished by contact of the crude cake with the purification filtrate at the desired conditions and separation as in the continuous agitated vessel scheme described above in one or more stages. It is also possible to dissolve, completely or partially, the crude "Dinoben" cake in contact with the purification filtrate by raising the temperature and/or pH (as by addition of an alkaline substance such as sodium hydroxide solution), then lower the pH and/or temperature to the desired lower level. This can be done in one stage or in a series of countercurrent stages. The latter approach might be used for a highly impure crude "Dinoben," but it is not usually necessary.

The final purification step in which the "Dinoben," substantially freed of phytotoxic impurities, is obtained, may be accomplished, likewise in an agitated vessel (or screw contacter or similar device) continuously or batch-wise. Furthermore, solution or partial solution of the crude "Dinoben" by means of an alkaline substance, such as NaOH, KOH, NH₄OH, etc. as is necessary in the usual purification procedure is not essential for most crude "Dinoben" cakes. Where a very crude "Dinoben" cake is involved, the purification can be improved by either the solution and reprecipitation of the enriched crude "Dinoben" at the final purification step, the use of more stages in the countercurrent contacting of crude "Dinoben" cake, or both.

For crude "Dinoben" derived from a purer 2,5-dichlorobenzoic acid, more than one stage is not even required in continuous screw operation. Instead, water at the desired pH and temperature is fed to the countercurrent first stage instead of the second stage purification filtrate.

By the practice of this invention, yield increases of 10–15% are readily obtained of a purified "Dinoben" of the desired low level of phytotoxic impurities as determined by VPC methods and greenhouse biological evaluation. Such a "Dinoben" is also suitable for further processing to a phytotoxically satisfactory "Amiben."

The following examples are illustrative of the present invention and are not to be regarded as limitative. It is to be understood that all parts, percentages and proportions referred to herein and in the appended claims are by weight unless otherwise indicated.

EXAMPLE I

The crude Dinoben employed in this example was derived from 2,5-dichlorobenzoic acid chloride of about 68% 2,5-dichlorobenzoic acid chloride content, by nitration of this 2,5-dichlorobenzoic acid chloride following hydrolysis. The crude Dinoben recovered upon drowning and washing contained on a dry weight basis, about 60% 2,5-dichloro-3-nitrobenzoic acid (Dinoben), about 15% of the very phytotoxic 2,5-dichloro-6-nitrobenzoic acid and about 1% of the less phytotoxic 2,5-dichlorobenzoic acid.

85 grams of this crude Dinoben were dissolved in water by the addition of sodium hydroxide to affect solution. The total weight of the solution was 500 grams, the temperature was adjusted to 40° C. and the pH was adjusted to 2.4 by the addition of concentrated sulfuric acid. The precipitated partially purified Dinoben was separated from the mother liquors. The partially purified Dinoben thus recovered was reslurried in 300 ml. of water and sufficient sodium hydroxide added to affect solution. The temperature was then adjusted to 70° C. and the pH adjusted to 3.1 by addition of sulfuric acid, and the thus precipitated purified Dinoben separated from the mother liquor by filtration and washed three times with 75 cc. portions of water at 70° C. The mother liquor and wash liquors were saved. The thus recovered 44.1 grams of pure Dinoben was suitable for use without further purification either as a herbicide per se or as converted Amiben, (2,5-dichloro-3-amino benzoic acid).

The procedure outlined above was again repeated using another sample of the same crude Dinoben cake, except that there was added to the crude cake the mother liquors and wash liquors saved in the above procedure. The yield in this case of purified Dinoben was 52.4 grams, melting point of 213 to 215.8° C. of acceptable purity for use as a herbicide per se or converted into Amiben.

The partially purified Dinoben recovered in the first precipitation at a pH of 2.4 and 40° C. was of satisfactory quality only for use as a herbicide after conversion into Amiben.

EXAMPLE II

A high purity 2,5-dichlorobenzoic acid was produced by the Friedel-Crafts reaction of phosgene on p-dichlorobenzene using AlCl$_3$ catalyst. The resultant acid chloride was hydrolyzed to the acid and the acid nitrated in sulfuric acid with a mixed nitric and sulfuric acid as nitrating agent. The nitration was drowned in water and filtered and washed with cold water and dried to give a crude Dinoben in 90.5% of theory yield. This product had the following VPC analysis:

| | Percent |
|---|---|
| 2,5-dichloro-3-nitrobenzoic acid | 72.6 |
| 2,5-dichlorobenzoic acid | 0.9 |
| 2,5-dichloro-6-nitrobenzoic acid | 26.5 |

EXAMPLE III

About 50 grams of a crude Dinoben cake prepared as in Example II was slurried with 125 cc. of water at 50° C. for one-half hour and the pH adjusted to 2.7 with sulfuric acid. The precipitated partially purified Dinoben was separated from the mother liquors. The partially purified Dinoben thus recovered was reslurried in 80 cc. of distilled water and sufficient sodium hydroxide added to affect solution. The temperature was then adjusted to 70° C. and the pH adjusted to about 3.0 by addition of sulfuric acid. The slurry was cooled to 50° C. and the thus precipitated purified Dinoben was washed three times with 25 cc. portions of water at 50° C. and the separated mother liquors and wash liquors saved. The dried pure Dinoben recovered amounted to 34.7 grams and had a melting point of 219 to 220° C. By VPC analysis, the purified Dinoben had essentially no 2,5-dichloro-6-nitrobenzoic acid and could be used per se as a herbicide for weed control without crop damage.

The procedure outlined above was again repeated on another 50 gram sample of crude cake prepared as in Example II, except that there was added to the crude cake the mother liquors and wash liquors saved in the above procedure. The final purified Dinoben obtained amounted to a yield of 37 grams and had a melting point of 219 to 220° C. The VPC analysis was as follows:

| | Percent |
|---|---|
| 2,5-dichlorobenzoic acid | 1.2 |
| 2,5-dichloro-6-nitrobenzoic acid | 0.04 |
| 2,5-dichloro-3-nitrobenzoic acid | 98.76 |

The thus purified Dinoben was completely suitable as a herbicide per se or as converted Amiben.

EXAMPLE IV

By way of comparison to the instant novel process the following standard purification was performed.

A 50 gram sample of the crude Dinoben prepared as in Example II was slurried in 150 ml. of distilled water at 60° C. It was then dissolved in water by the addition of sufficient sodium hydroxide to affect solution and the pH was adjusted to 2.5 at 60° C. with aqueous sulfuric acid. The precipitated Dinoben was separated from the mother liquors and washed three times with 25 ml. portions of water at 60° C. and then dryed. The thus recovered Dinoben amounted to 35.5 grams and had a melting point of 217 to 219° C. The VPC analysis was as follows:

| | Percent |
|---|---|
| 2,5-dichlorobenzoic acid | 0.5 |
| 2,5-dichloro-6-nitrobenzoic acid | 0.6 |
| 2,5-dichloro-3-nitrobenzoic acid | 98.9 |

This recovered Dinoben was not satisfactory for use as a herbicide per se because of its phytotoxic effect, but could be reduced to a useable Amiben. Moreover, the yield was 4% lower than the much more phytotoxically pure Dinoben prepared as in Example III.

EXAMPLE V

Again, by way of comparison, Example IV was repeated except this time the process was carried out at a pH of 3.0 and at 60° C. The thus recovered Dinoben amounted to 34.9 grams and had a melting point of 219–220° C. A VPC analysis showed the presence of 0.3% of 2,5-dichloro-6-nitrobenzoic acid. Like Example IV, this recovered Dinoben was not suitable for use as Dinoben per se, but only for use as converted Amiben. Moreover, the yield was 6% less than the much more phytotoxically pure Dinoben prepared as in Example III.

EXAMPLE VI

A very crude Dinoben cake that was 80.8% dry was prepared and it had a VPC analysis as follows:

| | Dry basis, percent |
|---|---|
| Dinoben (2,5-dichloro-3-nitrobenzoic acid) | 58.42 |
| 2,5-dichlorobenzoic acid | 1.51 |
| 2,5-dichloro-6-nitrobenzoic acid | 15.31 |
| Other impurities (primarily isomers) | 24.76 |

Twenty-five grams of the above crude cake (20.2 grams dry) was slurried at a pH of 2.0 and 30° C. with distilled water for one-half hour and the precipitated partially purified Dinoben separated from the mother liquors. This procedure was repeated for a total of three extractions. The partially purified Dinoben cake recovered from the third extraction had a dry weight of 13.9 grams and a VPC purity of 83%. It still contained 2.1% of the phytotoxic 2,5-dichloro-6-nitrobenzoic acid isomer.

The thus recovered impure Dinoben was reslurried in 50 cc. of water at 70° C. and brought into solution by adding alkali hydroxide. This 70° C. solution was acidified with aqueous sulfuric acid to adjust the pH to 3.4. The reprecipitated pure Dinoben was separated from the mother liquors and the mother liquors saved, washed three times with 10 cc. of 70° C. water and dried. The recovered pure Dinoben amounted to 10.8 grams and had a melting point of 217 to 219° C. and a VPC purity of 92% Dinoben. This Dinoben was biologically useable per se as a herbicide or as converted Amiben.

EXAMPLE VII

Example VI was repeated except the filtrate from the final acidification step at 70° C. and a pH of 3.4 was used in place of the second water extraction step at 30° C. and a pH of 2.0. The thus recovered pure Dinoben amounted to 12.5 grams of 92% VPC purity and had excellent biological properties such that the Dinoben per se could be used as a herbicide or converted to Amiben. The yield of 100% Dinoben was 11.5 grams.

EXAMPLE VIII

By way of comparison, 25 grams of the crude Dinoben cake (20.2 grams dry) prepared as in Example VI was slurried in 100 cc. of water at 65° C., dissolved by the addition of sodium hydroxide and reprecipitated at a pH of 3.0 and 65° C. by the addition of aqueous sulfuric acid. The slurry was stirred for one-half hour and the precipitated Dinoben separated out and washed three times with 25 cc. of 65° C. water and dried. The thus recovered Dinoben amounted to 11.1 grams and had a melting point of 213–216° C. Said Dinoben also had a VPC purity of 89% and a phytotoxic 2,5-dichloro-6-nitrobenzoic acid content of 0.6%. It was only useable for reduction to Amiben since it was too phytotoxic for use as Dinoben. The yield of 100% Dinoben was 9.9 grams, thus it can be seen that the countercurrent recycle of liquor process employed in Example VII gave a 16% higher yield of a much purer Dinoben product.

EXAMPLE IX

This example illustrates that when the starting material is a 2,5-dichlorobenzoyl chloride of very high purity, the instant invention results in obtaining Dinoben in high yields without any sacrifice in the purity of the Dinoben.

A series of three identical nitrations each using 146 grams of 89.6% 2,5-dichlorobenzoyl chloride following hydrolysis were run. The nitrated crude Dinoben products from each run were drowned in water and recovered by filtration and water wash.

The filtered crude cake obtained from the first nitration run was purified by slurrying the crude cake in water and adjusting the pH to 1.8–2.0 by the addition of sulfuric acid and the temperature to 35° C. to precipitate partially purified Dinoben which was recovered by filtration. The thus obtained partially purified Dinoben was then reslurried in water and dissolved by the addition of sodium hydroxide and acidified by the addition of sulfuric acid to adjust the pH to 3.0–3.1 and the temperature to 60° C. to precipitate purified Dinoben which was recovered by filtration and washing and the filtrate and wash waters were saved.

The saved filtrate and wash waters, mentioned above, were added to a slurry of the filtered crude cake obtained from the second nitration run and the entire two step purification procedure described above was repeated.

The saved filtrate and wash waters of the final purification step of the filtered crude cake from the second nitration run were added to a slurry of the filtered crude cake of the third nitration run and the entire two step purification process was again repeated.

The results of the three purification runs established by VPC for the purified Dinoben were as follows:

Purified Dinoben
Average yield percent effective, based on 100% 2,5-dichlorobenzoyl chloride content of the acid chloride charged _____ 70.0
Average VPC purity (3 runs), percent _____ 92.0

EXAMPLE X

This example illustrates that the instant invention may be carried out in a series of steps, wherein the temperature and pH of each succeeding step is adjusted so that either or both the temperature and pH are higher than the preceding step, and wherein the filtrate is always advancing toward the crude cake in a counter-current flow.

This 3-step purification process was carried out a series of three times, all charges containing 100 grams 100% dry of the crude cake.

Run I

Crude Dinoben cake was slurried in water to a volume of 1000 cc. and the pH and temperature were adjusted to 1.8 to 2.0 and 30° C. The resultant precipitate was separated and the filtered liquor discarded. The recovered precipitate was then reslurried with water to a volume of 400 cc. and the pH adjusted to 2.4–2.5 and the temperature adjusted to 50° C. The resultant precipitate from this second step was separated and the filtered liquor saved. This recovered precipitate was then reslurried with water to a volume of 250 cc. and the pH adjusted to 3.2–3.4 and the temperature adjusted to 75° C. From this third step, purified Dinoben was recovered by separation and was washed and dried and the wash and filtered liquors saved.

Run II

The three successive steps of Run I were repeated in a continuous fashion, each step being carried out at the same pH and temperature range as before, the only exceptions to Run I being as follows. The saved filtered liquor of the second step of Run I was added to the slurry of the first step of this Run II, said slurry comprising a new incoming crude Dinoben cake taken to a volume of 2000 cc. with water. Likewise, the saved wash and filtered liquors of the third step of Run I were added to the slurry of the second step of this Run II, said slurry comprising the precipitate of the first step of this Run II brought to a volume of 450 cc. with water.

Run III

The three successive steps of Run II were also repeated in a continuous fashion, again each step being carried out at the same pH and temperature range as before, the only exceptions to Run II being as follows. The saved filtered liquor of the second step of Run II was added to the slurry of the first step of this Run III, said slurry comprising a new incoming crude Dinoben cake adjusted to a volume of 2000 cc. with water. Likewise, the saved wash and filtered liquors of the third step of Run II were added to the slurry of the second step of this Run III, said slurry comprising the precipitate of the first step of this Run III adjusted to a volume of 500 cc. with water.

The average yield percent effective of the purified Dinoben recovered based on the acid chloride charged was 56.8. Moreover, the average VPC purity of the purified Dinoben recovered was 87%. The Dinoben was of satisfactory quality to be used as a herbicide per se.

Various modifications and variations of this invention will be obvious to a worker skilled in the art and it is understood that such modifications and variations are to be included within the purview of this application and the spirit and scope of the appended claims.

I claim:

1. A process for purifying 2,5-dichloro-3-nitrobenzoic acid from a crude nitration admixture, thereof, which comprises mixing the crude nitration admixture with a solution selected from the group consisting of water and aqueous alkaline solutions and adjusting the conditions of temperature and pH range in a series of slurry and precipitation steps, each succeeding adjustment of at least one of the conditions of temperature and pH being higher than in the immediately preceding precipitation step, beginning with a temperature in the range of about 20–60° C. and a pH in the range of about 1.8 to 2.8 and ending with a temperature of about at least 50° C. up to below the boiling point of the 2,5-dichloro-3-nitrobenzoic acid solution and a pH of about at least 2.4 to about 4 and separating and recovering the precipitated purified 2,5-dichloro-3-nitrobenzoic acid from the final step, the liquors of each precipitation step after the initial precipitation step being recycled to slurries of preceding precipitation steps.

2. A process for purifying 2,5-dichloro-3-nitrobenzoic acid from a crude nitration admixture, thereof, which comprises (1) mixing the crude nitration admixture with a solution selected from the group consisting of water and aqueous alkaline solutions; (2) adjusting the solution to a pH of about 1.8 to 2.8 and a temperature of 20–60° C.; (3) separating the precipitated partially purified 2,5-dichloro-3-nitrobenzoic acid; (4) admixing water and alkali hydroxide to the thus recovered 2,5-dichloro-3-nitrobenzoic acid; (5) adjusting at least one of the conditions of temperature and pH of step 4 above that of step 2, the temperature being about at least 50° C. up to below the boiling point of the 2,5-dichloro-3-nitrobenzoic acid solution and the pH being about at least 2.4 to about 4; (6) separating and recovering precipitated pure 2,5-dichloro-3-nitrobenzoic acid; and (7) recycling the liquor recovered from separation step 6 to a point prior to the initial purification step 2, specified above.

3. A process according to claim 2, wherein sufficient water and alkali hydroxide in step 4 is added to affect total solution.

4. A process for purifying 2,5-dichloro-3-nitrobenzoic acid from a crude nitration admixture, thereof, which comprises (1) mixing the crude nitration admixture was a solution selected from the group consisting of water and aqueous alkaline solutions; (2) acidifying the solution with a mineral acid at a temperature of 20–60° C. and a pH of about 1.8 to 2.8; (3) separating the precipitated partially purified 2,5-dichloro-3-nitrobenzoic acid; (4) affecting solution of the thus recovered 2,5-dichloro-3-nitrobenzoic acid by use of water and alkali hydroxide; (5) acidifying with a mineral acid the solution of step 4 at a temperature of 60–80° C. and a pH of about 2.8 to 3.4; (6) separating and recovering precipitated pure 2,5-dichloro-3-nitrobenzoic acid; and (7) recycling the liquor recovered from separation step 6 to a point prior to the initial purification step 2, specified above.

References Cited

UNITED STATES PATENTS 3,174,999  3/1965  Raman _____ 260—525

BERNARD HELFIN, *Primary Examiner.*

U.S. Cl. X.R.

71—115

UNITED STATES PATENT OFFICE
CERTIFICATE OF CORRECTION

Patent No. 3,417,137                              December 17, 1968

David E. Graham

It is certified that error appears in the above identified patent and that said Letters Patent are hereby corrected as shown below:

Column 10, line 11, after "admixture", "was" should read -- with --.

Signed and sealed this 17th day of March 1970.

(SEAL)
Attest:

Edward M. Fletcher, Jr.                       WILLIAM E. SCHUYLER, JR.
Attesting Officer                               Commissioner of Patents